(12) United States Patent
Fujikura et al.

(10) Patent No.: US 8,496,097 B2
(45) Date of Patent: Jul. 30, 2013

(54) MOUNT DAMPER AND IMAGE FORMING APPARATUS USING THE MOUNT DAMPER

(75) Inventors: Teruhiko Fujikura, Toyokawa (JP); Munehiro Natsume, Toyokawa (JP); Mutsuto Oe, Hoi-gun (JP); Yuji Kobayashi, Toyohashi (JP); Hiroyuki Yoshikawa, Toyohashi (JP); Katsuyuki Ikuta, Toyokawa (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1149 days.

(21) Appl. No.: 12/419,386

(22) Filed: Apr. 7, 2009

(65) Prior Publication Data

US 2009/0301828 A1 Dec. 10, 2009

(30) Foreign Application Priority Data

Jun. 9, 2008 (JP) ................. 2008-150185

(51) Int. Cl.
*F16M 13/00* (2006.01)
(52) U.S. Cl.
USPC ............................ 188/378; 267/136; 248/550
(58) Field of Classification Search
USPC ............ 188/267.1, 267.2, 378–380; 267/136, 267/137, 140.14–140.15; 248/550; 310/51
See application file for complete search history.

(56) References Cited

U.S. PATENT DOCUMENTS

| | | | | |
|---|---|---|---|---|
| 5,333,455 A | * | 8/1994 | Yoshioka | 60/533 |
| 5,456,341 A | * | 10/1995 | Garnjost et al. | 188/378 |
| 5,475,043 A | | 12/1995 | Shiga et al. | |
| 5,660,255 A | * | 8/1997 | Schubert et al. | 188/378 |
| 5,924,670 A | * | 7/1999 | Bailey et al. | 248/550 |
| 5,986,385 A | * | 11/1999 | Atsuta | 310/323.06 |
| 6,082,719 A | * | 7/2000 | Shtarkman et al. | 267/140.14 |
| 7,222,704 B2 | * | 5/2007 | Pearson et al. | 188/378 |
| 2003/0006109 A1 | * | 1/2003 | Ogura et al. | 188/267.1 |

FOREIGN PATENT DOCUMENTS

| | | |
|---|---|---|
| JP | 03-091541 | 4/1991 |
| JP | 6-264970 A | 9/1994 |
| JP | 2002-535582 | 10/2002 |
| JP | 2004-165416 | 6/2004 |
| JP | 2005-287246 A | 10/2005 |
| JP | 2006-46381 A | 2/2006 |
| JP | 2006-234038 | 9/2006 |
| WO | WO 00/45067 | 8/2000 |

OTHER PUBLICATIONS

Office Action (Notification of Reason(s) for Refusal) dated Jan. 11, 2011, issued in the corresponding Japanese Patent Application No. 2008-150185, and an English Translation thereof.
Notification of Reason(s) for Refusal issued in the corresponding Japanese Patent Application No. 2008-150185 dated Apr. 20, 2010, and an English Translation thereof.

* cited by examiner

*Primary Examiner* — Christopher Schwartz
(74) *Attorney, Agent, or Firm* — Buchanan Ingersoll & Rooney PC

(57) ABSTRACT

A mount damper comprises electrode plates placed on a motor side and a support body side respectively, a control unit for adjusting voltage between the electrode plates, and an electrostrictive polymer member for changing a distance between the electrode plates by the voltage therebetween. The electrostrictive polymer member is also an elastic body sandwiched between the electrode plates and has a hardness changeable with a change in the interelectrode distance. A motor is mounted through this mount damper. The control unit adjusts voltage applied between the electrode plates to a value different from a value causing resonance of the motor and the electrostrictive polymer member, thereby absorbing vibration of the motor during rotation thereof, irrespective of a rotation speed. Thus, the mount damper and the image forming apparatus using it can reliably prevent resonance and absorb vibration constantly even if a device selectively uses plural levels of the rotation speed.

14 Claims, 14 Drawing Sheets

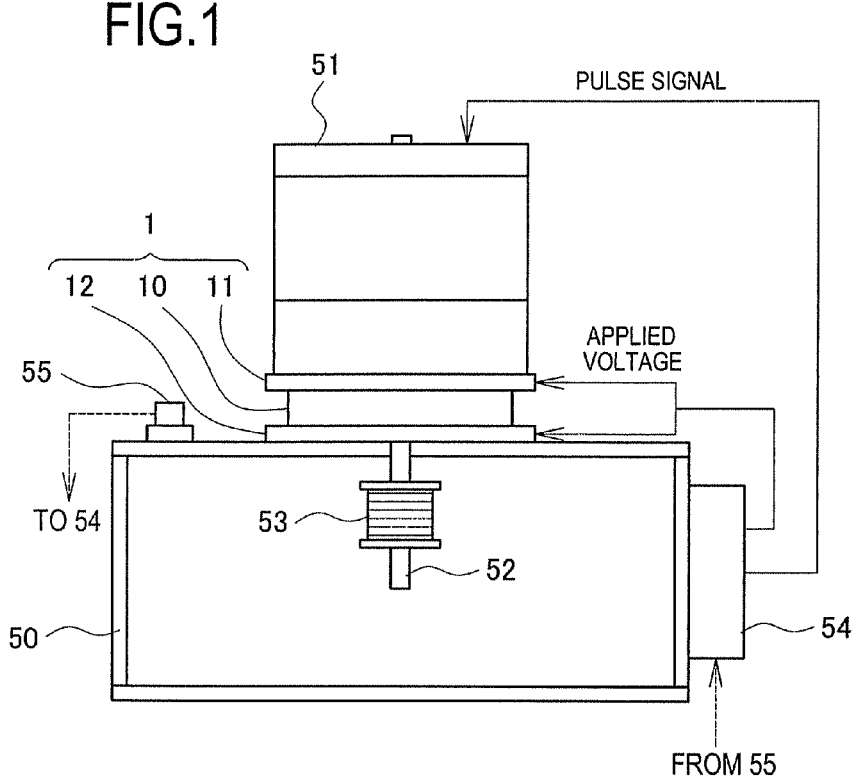

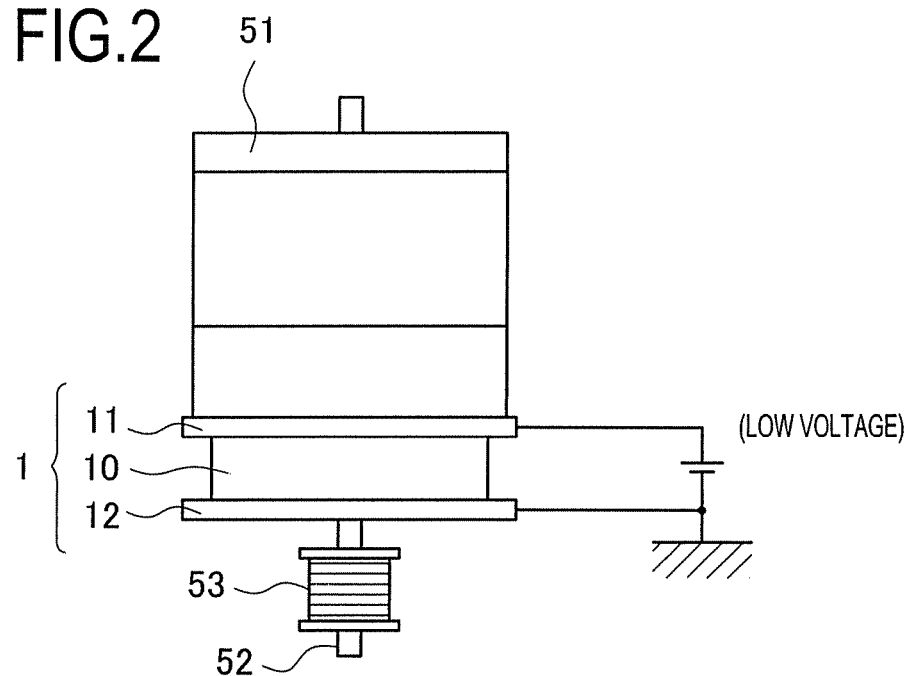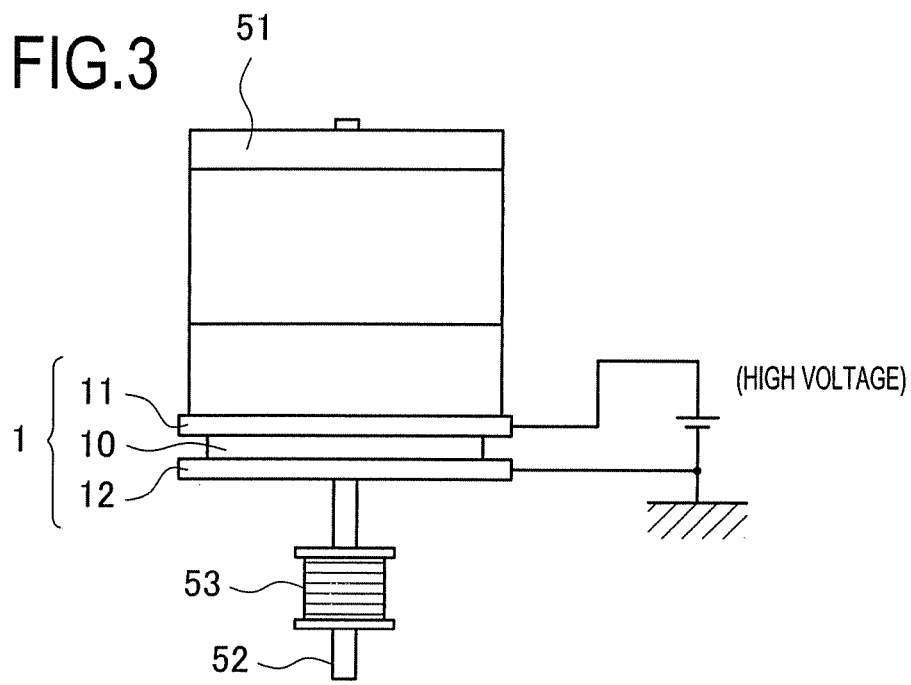

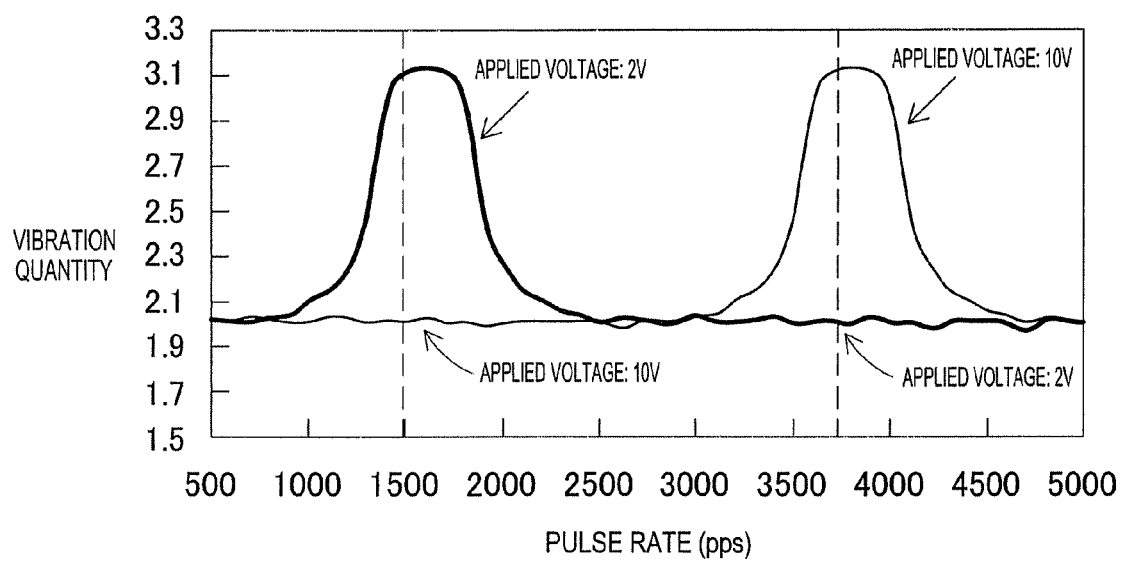
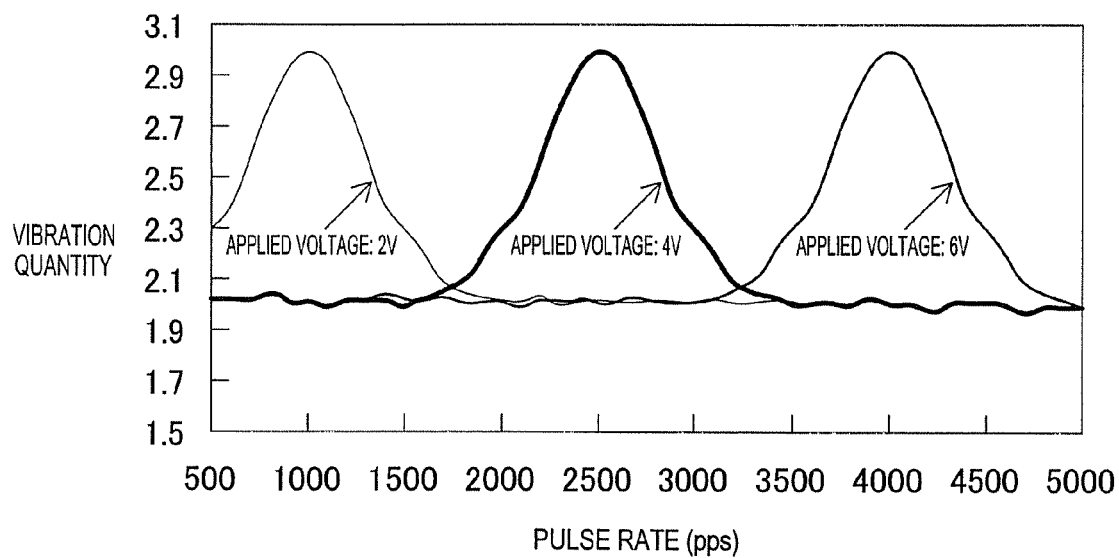

X: Thin Plate
Y: Thick Plate

MOUNT DAMPER AND IMAGE FORMING APPARATUS USING THE MOUNT DAMPER

CROSS-REFERENCE TO RELATED APPLICATIONS

This application is based upon and claims the benefit of priority from the prior Japanese Patent Application No. 2008-150185 filed on Jun. 9, 2008, the entire contents of which are incorporated herein by reference.

TECHNICAL FIELD

The present invention relates to a mount damper for mounting a rotary drive source on a support body and absorbing vibration of the rotary drive source during driving rotation thereof, and to an image forming apparatus using the mount damper. More particularly, the present invention relates to a mount damper and an image forming apparatus, capable of preventing resonance of the rotary drive source at a specified rotation speed.

BACKGROUND ART

In some apparatuses using rotary drive sources such as motors, conventionally, the rotary drive source is mounted on a support body through a mount damper. This is because the rotary drive source usually vibrate during driving rotation. That is, the mount damper absorbs vibration to prevent the entire apparatus from greatly vibrating. It is particularly essential for a precision apparatus such as an image forming apparatus to prevent vibration which would deteriorate the accuracy of operation of each part or component. For the image forming apparatus, for example, excessive vibration will deteriorate image quality.

A conventional mount damper is generally configured such that an elastic body made of rubber or the like is placed between a support body and a rotary drive source. Thus, flexibility of the elastic body absorbs vibration of the rotary drive source, thereby preventing direct transfer of vibration of the rotary drive source to the support body. This type of the mount damper is disclosed for example in Patent Literature 1.

CITATION LIST

Patent Literature

Patent Literature 1: JP2006-46381A

SUMMARY OF INVENTION

Technical Problem

However, the aforementioned conventional mount damper has the following problems. Specifically, the conventional mount damper could not sufficiently respond to a change in the rotation speed of the rotary drive source. This results from that rubber hardness is constant, not changeable. The state where a heavy object such as a rotary drive source is mounted by use of this type of the mount damper can be considered as a kind of "pendulum" in which the heavy object is located at an end of an elastic body. If a vibration period of the rotary drive source is close to a natural period of the pendulum oscillation, the vibration will diverge due to resonance. In other words, the mount damper could not absorb vibration. The natural period of the pendulum depends on weight of the rotary drive source, hardness and size of the elastic body, etc.

On the other hand, the vibration period of the rotary drive source depends on its rotation speed. For a device in which a rotary drive source has a fixed rotation speed, the hardness of the elastic body and others are determined to avoid the vibration periods of the pendulum and the rotary drive source from becoming approximate to each other.

However, there is also a device in which a rotary drive source has plural rotation speeds. For the image forming apparatus, for example, a process speed may be changed according to the kind of print sheet (paper), image definition, etc. In such a case, resonance would sometimes occur depending on the rotation speed. Consequently, some operating conditions may cause undesirable phenomena, such as occurrence of abnormal noise, vibration of the entire device, and a decrease in output power of the rotary drive source. For the image forming apparatus, there is a case where images are formed with very low quality.

The present invention has been made to solve the above problems and has a purpose to provide a mount damper capable of reliably and constantly preventing resonance and absorbing vibration even in a device arranged to selectively use two or more different levels of rotation speed of a rotary drive source, and provide an image forming apparatus using the mount damper.

Solution to Problem

To achieve the above object, the present invention provides a mount damper for mounting a rotary drive source on a support body and absorbing vibration of the rotary drive source during driving rotation thereof, the mount damper comprising: a first electrode to be placed on a side of the rotary drive source; a second electrode to be placed on a side of the support body; a voltage control section for controlling voltage to be applied between the first and second electrodes; an electrostrictive polymer member for changing a distance between the first and second electrodes by the voltage between those electrodes; and an elastic body placed between the first and second electrodes, the elastic body having a hardness changeable with the change in the distance between the first and second electrodes, wherein the voltage control section adjusts a value of the voltage to be applied between the first and second electrodes to a value different from a value at which the rotary drive source and the elastic body resonate.

Herein, the electrostrictive polymer member may also be used as the elastic body or may be a member provided separately from the elastic body.

In this mount damper, the voltage control section controls the voltage to be applied (hereinafter, also referred to as "applied voltage") between the first and second electrodes. Accordingly, the electrostrictive polymer member changes a distance between the electrodes, thereby changing the thickness of the elastic body. Thus, the hardness of the elastic body becomes such as not to allow resonance between the rotary drive source and the elastic body. The rotary drive source therefore can rotate while its vibration is reliably absorbed by the mount damper.

According to another aspect, the present invention provides an image forming apparatus comprising: an image forming unit for forming an image on a visible recording medium; a sheet feed mechanism for feeding the visible recording medium to be supplied to the image forming unit; a rotary drive source placed in the image forming apparatus; and a mount damper mounting the rotary drive source on the image forming apparatus and absorbing vibration of the rotary drive source during driving rotation thereof, wherein the mount damper comprises: a first electrode placed on a side of the rotary drive source; a second electrode placed on a side of the image forming apparatus; a voltage control section for controlling voltage to be applied between the first and second electrodes; an electrostrictive polymer member for changing a distance between the first and second electrodes by the voltage between those electrodes; and an elastic body placed between the first and second electrodes, the elastic body having a hardness changeable with the change in the distance between the first and second electrodes, wherein the voltage control section adjusts a value of the voltage to be applied between the first and second electrodes to a value different from a value at which the rotary drive source and the elastic body resonate.

Advantageous Effects of Invention

According to the present invention, a mount damper capable of reliably and constantly preventing resonance and absorbing vibration even in a device arranged to selectively use two or more different levels of rotation speed, and an image forming apparatus using the mount damper.

BRIEF DESCRIPTION OF DRAWINGS

The accompanying drawings, which are incorporated in and constitute a part of this specification illustrate an embodiment of the invention and, together with the description, serve to explain the objects, advantages and principles of the invention.

FIG. 1 is a front view of a mount damper in a first embodiment;

FIG. 2 is a front view of the mount damper under a condition that interelectrode voltage is low;

FIG. 3 is a front view of the mount damper under a condition that interelectrode voltage is high;

FIG. 5 is a graph (Part 1) showing a relationship between motor rotation speed and vibration quantity for each damper voltage;

FIG. 6 is a graph (Part 2) showing a relationship between motor rotation speed and vibration quantity for each damper voltage;

DESCRIPTION OF EMBODIMENTS

Figure 4:
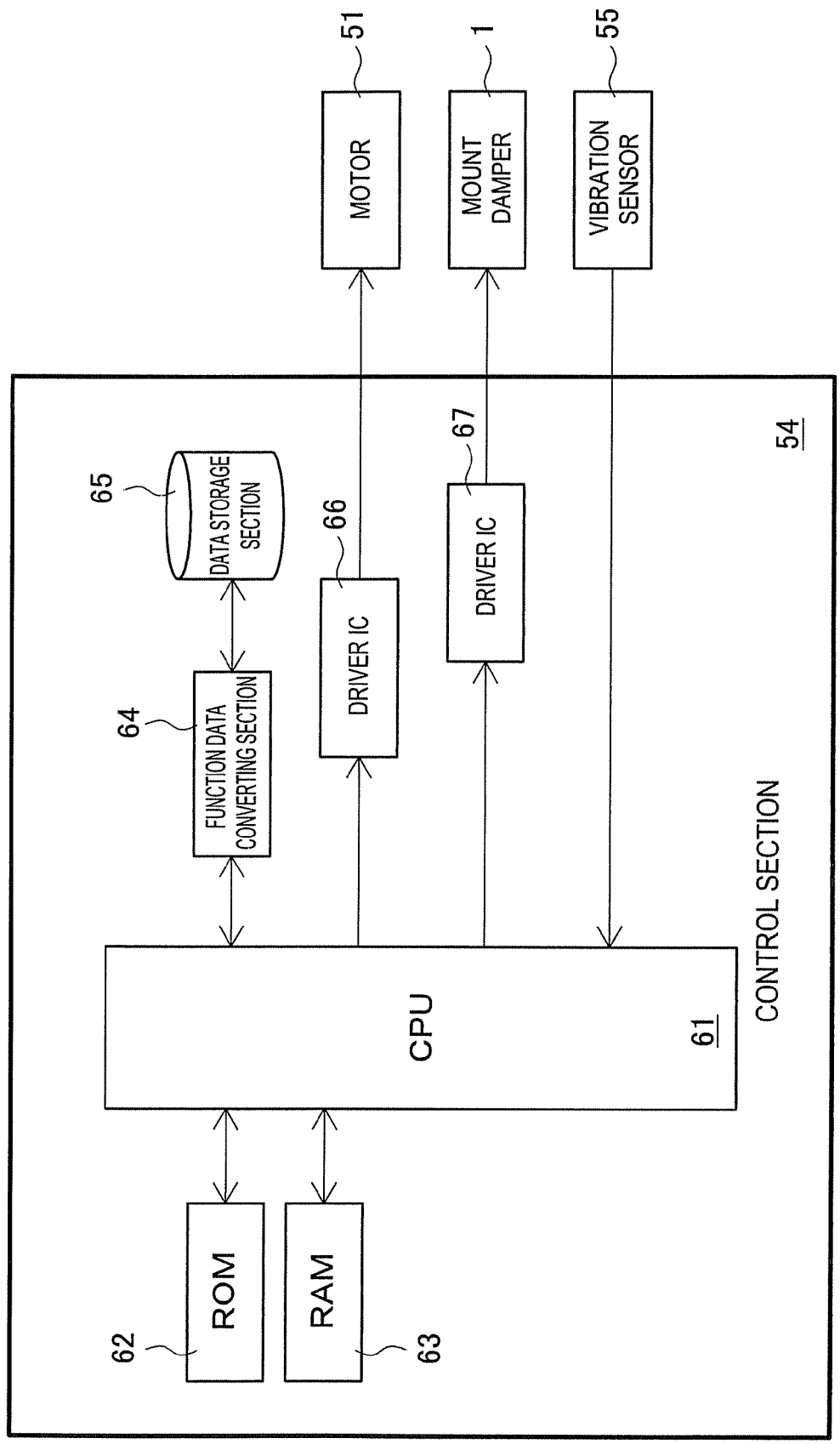
FIG. 4 is a block diagram of a configuration of a control section.

A detailed description of a preferred embodiment of the present invention will now be given referring to the accompanying drawings.

First Embodiment

A mount damper of this embodiment is configured as shown in FIG. 1. FIG. 1 shows the mount damper 1 of this embodiment together with a support body 50 and a motor 51. Specifically, the motor 51 is mounted on the support body 51 through the mount damper 1 of this embodiment. The motor 51 is a stepping motor. The support body 50 shown in FIG. 1 is illustrated in a very simplified form as compared with an actual shape. A gear 53 is attached on a rotary shaft 52 of the motor 51. The rotary shaft 52 extends through the mount damper 1, and the gear 53 is located inside the support body 50. The support body 50 is further provided with a control section 54 and a vibration sensor 55.

The mount damper 1 in FIG. 1 is configured such that an electrostrictive polymer member 10 is sandwiched between two electrode plates 11 and 12. These electrode plates 11 and 12 are bonded to both end faces of the electrostrictive polymer member 10. The electrode plate 11 is an electrode located on the side of the motor 51 and the electrode plate 12 is an electrode located on the side of the support body 50. The electrode plate 11 is fixed to the motor 51 and the electrode plate 12 is fixed to the support body 50, respectively. A part of the support body 50 may also be used as an electrode instead of the electrode plate 12.

The electrostrictive polymer member 10 is made of a polymeric material which can expand and contract by application thereto of an electric field. For example, it may be selected from an ICPF actuator which is deformed by movement of charged radicals in polymer, a conductive polymer actuator which is deformed in such a way that polymer electrodes adsorb ions in an electrolyte, a piezoelectric polymer actuator whish is deformed by an inverse piezoelectric effect resulting from induced polarization of polymer itself, an electrostrictive polymer actuator which is deformed by deformation of polymer in an intermediate layer by coulomb force that occurs in an electrode between polymers, etc. (see Page 60 in the August 2003 issue of Technical Report by Matsushita Electric Works, Ltd.).

The vibration sensor 55 is an acceleration sensor for detecting a degree of the vibration of the support body 50. An output signal from the vibration sensor 55 is input to the control section 54. The control section 54 is a control board for operation of the motor 51 and application of voltage to the mount damper 1. The operation of the motor 51 is a general technique. The application of voltage to the mount damper 1 is conducted in detail as follows. Specifically, the electrode plate 12 on the support body 50 side is put at a ground potential and the electrode plate 11 on the motor 51 side is put at positive potential, that is, a non-ground potential.

The mount damper 1 comes into a state shown in FIG. 2 when an absolute value of the voltage between the electrode plates 11 and 12 is small (including 0V) and into a state shown in FIG. 3 when the absolute value is large. The thickness of the electrostrictive polymer member 10 is smaller in the state of FIG. 3 than in the state of FIG. 2. This is because the electrostrictive polymer member 10 contracts in response to the electric field generated by the voltage between the electrode plates 11 and 12. The electrostrictive polymer member 10 in a contracted state as shown in FIG. 3 is harder than in FIG. 2. Accordingly, the resonant frequency of the mount damper 1 is different between the states of FIG. 2 and FIG. 3. The resonant frequency in the state of FIG. 3 is higher than in the state of FIG. 2. In other words, the electrostrictive polymer member 10 in the mount damper 1 of this embodiment has a function of changing a distance between the electrode plates 11 and 12 by voltage and also a function of changing hardness according to the distance between the electrodes.

As is found from FIGS. 2 and 3, the motor 51 is slightly moved in an axial direction by a change in applied voltage. In association with this, the gear 53 is also moved a little in the axial direction. It is therefore necessary to avoid this movement from affecting an engagement state of the gear 53. Accordingly, the gear 53 or an opposite gear needs to be designed to have a certain degree of width (height in the figures) enough to maintain the engagement state of the gear 53.

The control section 54 is configured as shown in FIG. 4. The control section 54 in FIG. 4 includes a CPU 61, a ROM 62, a function data converting section 64, a data storage section 65, a driver IC 66, and a driver IC 67. A signal representing a vibration quantity from the vibration sensor 55 is input into the CPU 61. The driver IC 66 outputs a drive signal to the motor 51. The driver IC 67 outputs a voltage signal to the mount damper 1. Both the driver ICs 66 and 67 are controlled by the CPU 61.

The ROM 62 stores data tables needed for voltage control of the mount damper 1. To be concrete, there are a "standard table" indicating a relationship between rotation speed of the motor 51 and standard applied voltage, a "mounting-condition correcting data table" indicating correcting data for each type of support body 50, and other tables.

Concrete operations of the mount damper 1 of this embodiment will now be explained below. A first explanation is given to the control of applied voltage to the mount damper 1 according to the rotation speed of the motor 51. Herein, it is discussed the case when the rotation speed of the motor 51 is controlled at two different levels, 1500 pps and 3700 pps in terms of pulse rate. In this case, the applied voltage to the mount damper 1 is controlled at two different levels, 2V and 10V.

FIG. 5 is a graph showing a relationship between the rotation speed of the motor 51 and a vibration quantity of the support body 50. In FIG. 5, a vertical axis represents an output value of the vibration sensor 55 and a horizontal axis represents a pulse rate of the drive signal from the driver IC 66 to the motor 51. It should be understood that the rotation speed of the motor 51 is higher as the pulse rate is higher.

FIG. 5 shows a graph indicating the case of the applied voltage of 2V to the mount damper 1 and a graph indicating the case of applied voltage of 10V, respectively. On the graph of the 2V case, the vibration quantity is mostly small for more than 2500 pps and is plotted in an upward convex curve (a mountain-like shape) for less than 2500 pps. The peak is near 1500 pps. On the other hand, on the graph of the 10V case, the vibration quantity is mostly small for less than 3000 pps and is plotted in an upward convex curve (a mountain-like shape) for more than 3000 pps. The peak is near 3700 pps.

Such a mountain-like shape of the graphs indicating the vibration quantity results from that the voltage frequency of the motor 51 is close to the resonant frequency of the mount damper 1. In other words, the vibration of the motor 51 is transmitted to the support body 50 without being absorbed by the mount damper 1. In a pulse rate region with small vibration quantity, on the other hand, the vibration of the motor 51 is absorbed by the mount damper 1 and is not transmitted to the support body 50. As is obvious from FIG. 5, in the case of the applied voltage of 10V, causing the electrostrictive polymer member 10 to be harder, resonance occurs when the rotation speed is higher.

Thus, the applied voltage to the mount damper 1 has to be selected in use from different levels according to the rotation speed of the motor 51 as in the following manner. Specifically, the applied voltage is set at 10V for a low rotation speed and on the other hand at 2V for a high rotation speed. The boundary between the low speed and the high speed may be determined at some point in a range of 2500 pps to 3000 pps. Accordingly, for a pulse rate of about 1500 pps, corresponding to the low speed operation, the applied voltage of 10V is selected. For a pulse rate of about 3700 pps, corresponding to the high speed operation, the applied voltage of 2V is selected. By such selection of the applied voltage, it is possible to constantly prevent resonance and operate the motor 51 without largely vibrating the support body 50. To that end, relevant data should be stored in the "standard table" in the ROM 62 in FIG. 4.

Figure 7:
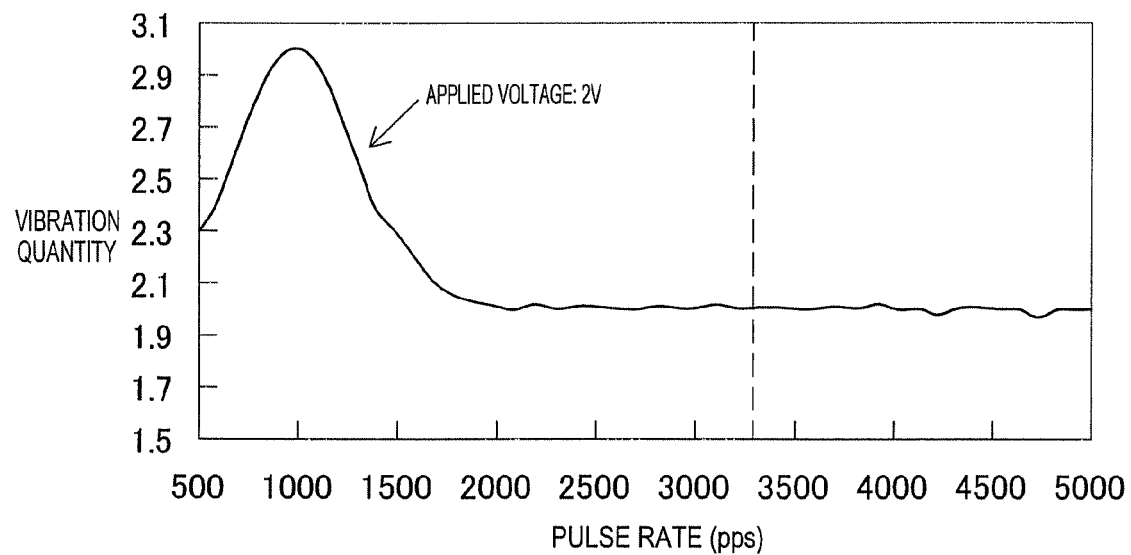
FIG. 7 is a graph showing a relationship between motor rotation speed and vibration quantity for a damper voltage of 2V.

Of course, the applied voltage may be selected from three levels. FIG. 6 is a graph showing a relationship between the rotation speed of the motor 51 and the vibration quantity of the support body 50 at three different levels of applied voltage, 2V, 4V, and 6V. The vibration characteristics as shown in FIG. 6 can be stored in the "standard table" in the ROM 62. Minimum required data for the relevant table is the rotation speed corresponding to the peak and the width of the mountain-like graph for each applied voltage. Accordingly, the applied voltage can be selected appropriately according to the rotation speed of the motor 51. In the case where the motor 51 is operated at a pulse rate of 3300 pps, for example, the applied voltage of 2V is selected as shown in FIG. 7. This is because, on the graph indicating the applied-voltage of 2V in FIG. 6, the pulse rate of 3300 pps is far from the mountain-like curve, the vibration quantity corresponding to the pulse rate is a low level, thus causing no resonance.

On the other hand, the graphs for 4V and 6V in FIG. 6 show that the pulse rate of 3300 pps is within the range of the mountain-like curve, even though the vibration quantity is near the base thereof. When the applied voltage of 4V or 6V is used at the pulse rate 3300 pps, slightly larger vibration than that in the case of the applied voltage of 2V would occur. Furthermore, resonance may occur when the pulse rate is drifted. When the motor 51 is operated at a pulse rate different from 3300 pps, the applied voltage appropriate for that pulse rate has to be selected.

Both the graphs of FIGS. 5 and 6 are obtained in such a way that the output values of the vibration sensor 55 are recorded by scanning the pulse rate in small steps in relation to each applied voltage to the mount damper 1. The model of the motor 51 used herein is different between the graphs of FIGS.

5 and 6. This is a reason why the mountain-like curve for the same applied voltage of 2V appears in different positions between FIGS. 5 and 6.

Figure 8:
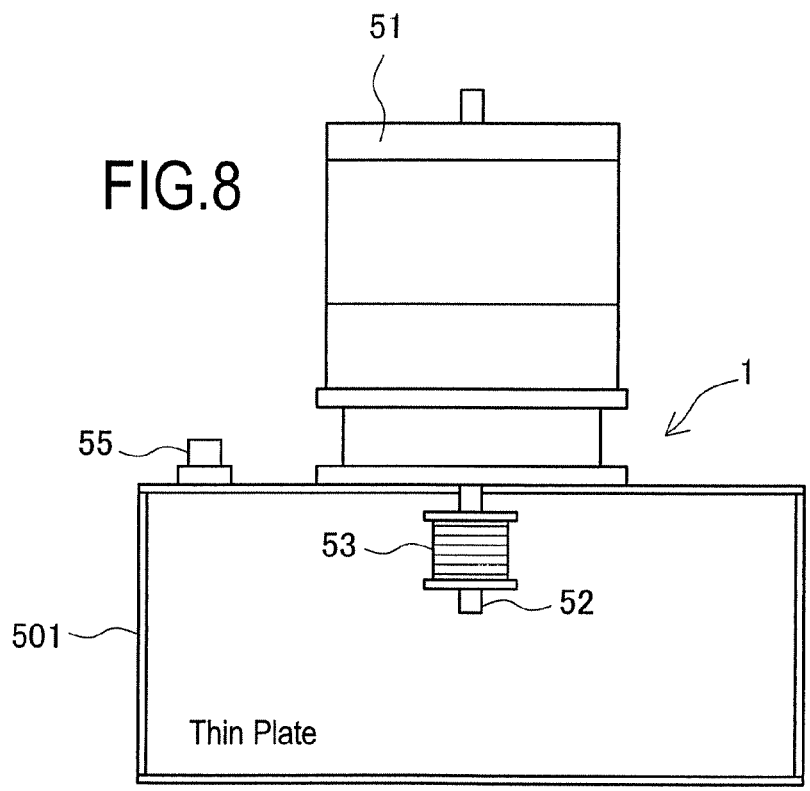
FIG. 8 is a front view showing an example using a support body made of a thin plate.
Figure 9:
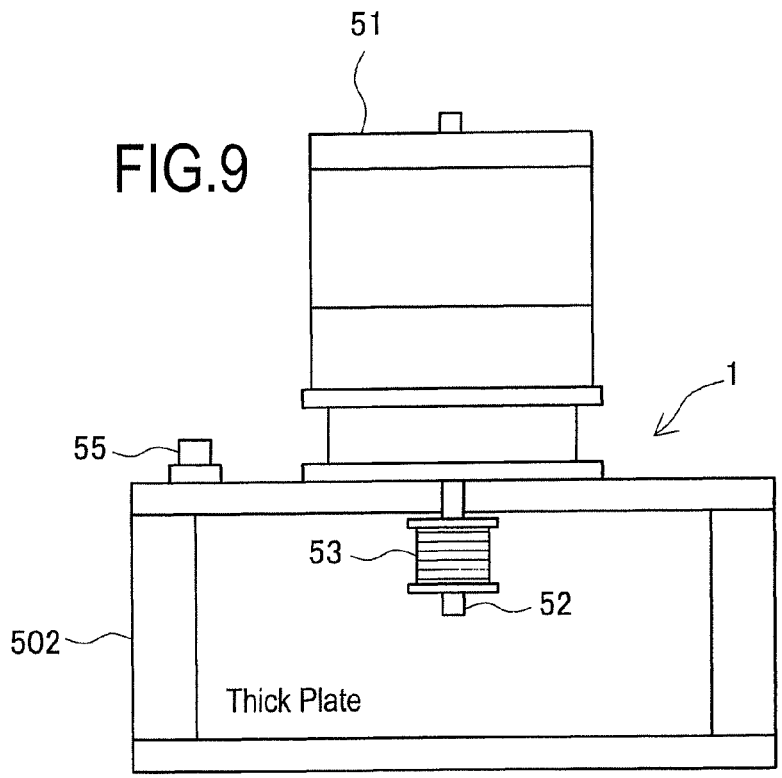
FIG. 9 is a front view showing an example using a support body made of a thick plate.

The following explanation is given to the control of applied voltage to the mount damper 1 according to the mounting condition of the motor 51. Herein, the mounting condition of the mount damper 1 is exemplified in two different cases; a first case where the support body 50 is constituted of a thin plate and a second case where the support body 50 is constituted of a thick plate. FIG. 8 shows the first case in which the motor 51 is mounted on a support body 501 constituted of the thin plate through the mount damper 1. FIG. 9 is the second case in which the motor 51 is mounted on a support body 502 constituted of the thick plate through the mount damper 1. In FIGS. 8 and 9, the control section 54 is omitted for convenience.

Furthermore, the rotation speed of the motor 51 is herein set at 2000 pps in terms of pulse rate. The applied voltage to the mount damper 1 is set at 2V which is a standard value. This standard value is used as long as it is not particularly required to be changed.

Figure 10:
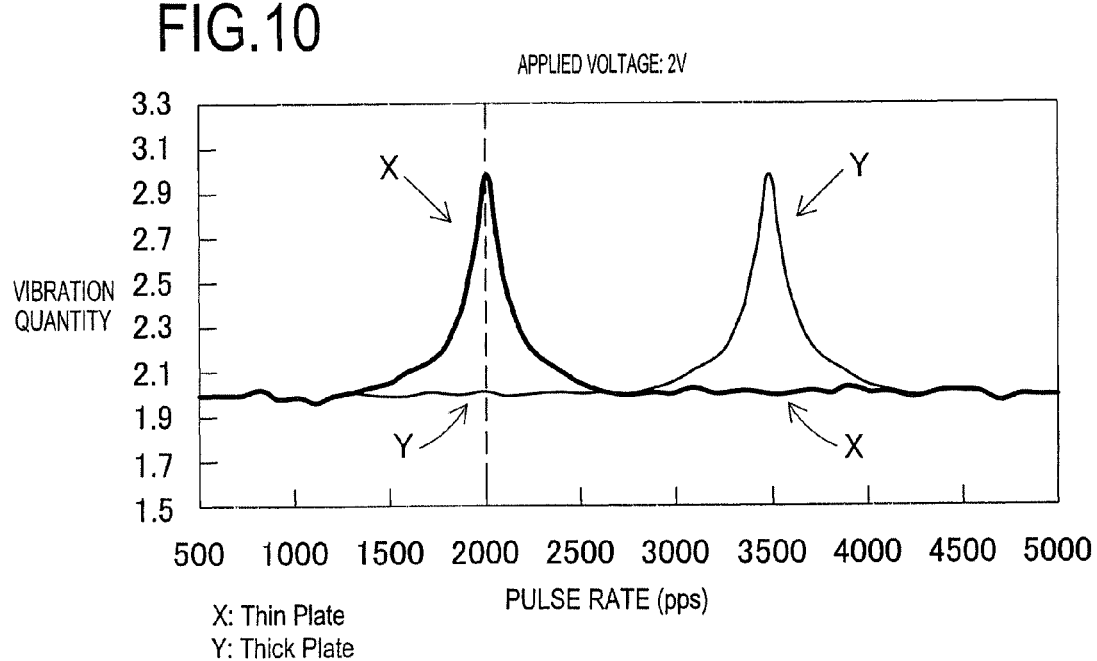
FIG. 10 is a graph showing a relationship between motor rotation speed and vibration quantity for each thickness of plate.

FIG. 10 is a graph showing a relationship between the rotation speed of the motor 51 and the vibration quantity of the support body 501 and 502. FIG. 10 shows a graph indicating the use of the support body 501 (thin plate) of FIG. 8 and a graph indicating the use of the support body 502 (thick plate). In both cases, the applied voltage to the mount damper 1 is the standard value, 2V.

On the graph of the "thin plate" case, the vibration quantity is mostly small for more than 2500 pps and is plotted in an upward convex curve (a mountain-like shape) for less than 2500 pps. The peak is near 2000 pps. On the other hand, on the graph of the "thick plate" case, the vibration quantity is mostly small for less than 3000 pps and is plotted in an upward convex curve (a mountain-like shape) for more than 3000 pps. The peak is near 3500 pps.

In the case of using the support body 502 (thick plate), accordingly, the motor 51 can be operated at 2000 pps without causing resonance by the standard applied voltage of 2V. In the case of using the support body 501 (thin plate), on the other hand, the motor 51 operated at 2000 pps by the standard applied voltage of 2V will cause resonance. Thus, when the support body 501 (thin plate) is used, it is preferable to use different applied voltage from the standard applied voltage of 2V.

Figure 11:
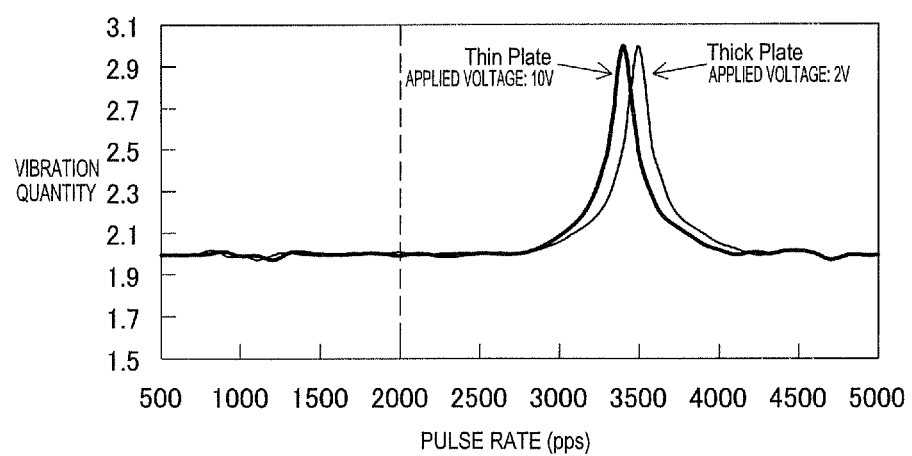
FIG. 11 is a graph showing a relationship between motor rotation speed and vibration quantity in the case where different interelectrode voltages are used.

Therefore, in FIG. 11, a graph shows a relationship between the rotation speed of the motor 51 and the vibration quantity of the support body 501 in the case where the applied voltage is changed. In FIG. 11, a graph (a bold line) indicates the case where the support body 501 (thin plate) of FIG. 8 is used and the applied voltage to the mount damper 1 is changed to 10V. In FIG. 11, for comparison, a graph (a thin line) indicates the case where the support body 502 (thick plate) of FIG. 9 is used and the applied voltage remains 2V. This latter graph is the same as in FIG. 10.

On the graph indicating the thin plate case in FIG. 11, the vibration quantity is mostly small for 3000 less than pps and is plotted in an upward convex curve (a mountain-like shape) for more than 3000 pps. The peak is near 3400 pps. In other words, as compared with the case of using the applied voltage of 2V ("Thin plate" in FIG. 10), the position of the mountain-like curve is shifted to a high speed side. This position of the mountain-like curve is almost the same at that for the case of the thick plate and the applied voltage of 2V. This is because the applied voltage to the mount damper 1 is changed to a higher voltage, thereby causing the electrostrictive polymer member 10 to contract and harden. The resonant frequency is therefore changed upward. This reveals that, even in the case of the thin plate, increasing of the applied voltage to 10V enables the operation of the motor 51 at 2000 pps without causing resonance.

Consequently, the applied voltage to the mount damper 1 has to be selected as below according to the mounting condition of the motor 51. Specifically, when the motor 51 is mounted on the support body 502 made of a thick plate, the applied voltage is set at 2V. When the motor 51 is mounted on the support body 501 made of a thin plate, on the other hand, the applied voltage is set at 10V higher than the former case. By this selection of the applied voltage, the motor 51 can be operated at 2000 pps while preventing resonance irrespective of the condition of the mounting place.

To that end, the "mounting-condition correcting data table" corresponding to the mounting condition is stored in advance in the ROM 62 in FIG. 4 according to device specifications. For a device having motors 51 individually mounted in several places, data on a mounting condition of each place is stored in the ROM 62 and also a plurality of "mounting-condition correcting data tables" associated with the mounting conditions is stored in the ROM 62.

Figure 12:
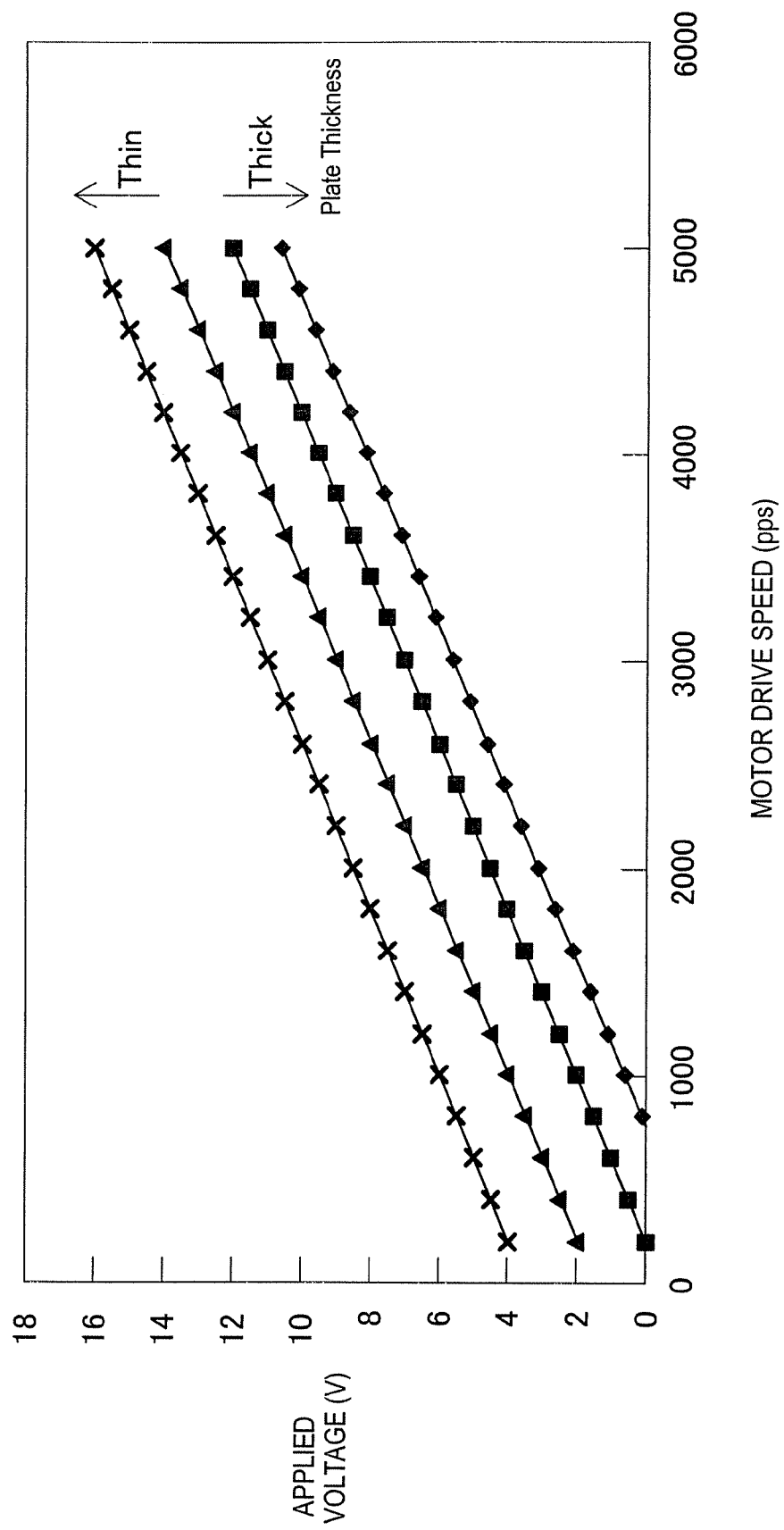
FIG. 12 is a graph showing an example of a relationship between motor rotation speed and damper voltage at which resonance occurs, the graph plotting for each motor mounting condition.

FIG. 12 is a graph showing an example of a relationship between the motor rotation speed and damper voltage at which resonance occurs, for each thickness of plate of the support body. In FIG. 12, the graph is plotted for four plates having different thickness in terms of a relationship between the motor rotation speed and the damper voltage at which resonance occurs. It is found from FIG. 12 that, for any thickness, as the motor rotation speed is higher, the damper voltage at which resonance occurs is higher. For the same damper voltage, furthermore, as the plate is thicker, resonance occurs at a higher rotation speed.

In the data tables stored in the ROM 62, an avoidance region determined by giving a certain width to each curve on the graph of FIG. 12 is stored for each plate thickness. The damper voltage is selected outside the avoidance region according to the plate thickness and the motor rotation speed. The width of the avoidance region may be determined in consideration of the width of the mountain-like shape on the graph as shown in FIG. 10.

The model of the motor 51 used in FIGS. 10 and 11 is different from that of FIG. 12. Thus, the peak positions on the graphs of FIGS. 10 and 11 do not correspond to the data in FIG. 12. This also reveals that it is more preferable to determine the damper voltage by additionally considering the model of the motor 51. That is, the graph as shown in FIG. 12 may also be prepared for each model of motor 51. Furthermore, it is also possible to prepare a graph as shown in FIG. 12 to plot curves for every model of the motor 51 under the condition of the same plate thickness. Similarly, it is possible to prepare a graph as shown in FIG. 12 to plot curves for every plate thickness and every model of the motor 51.

The above description considers only the thickness of the plate of the support body 50 as the mounting condition of the motor 51, but it is not limited thereto. The material of the plate and the structure of the support body 50 also may be considered. As to the size and other conditions of the electrostrictive polymer member 10 of the mount damper 1, similarly, it should be considered if a plurality of electrostrictive polymer members is selectively used. However, in practice, it is one of advantages of the present invention to respond to different rotation speeds and others by a single type of mount damper 1. This is because the above setting of the applied voltage can cover differences between the rotation speeds and between the mounting conditions. Accordingly, selective using of a plurality of types of mount damper 1 is not so often required.

Second Embodiment

Figure 13:
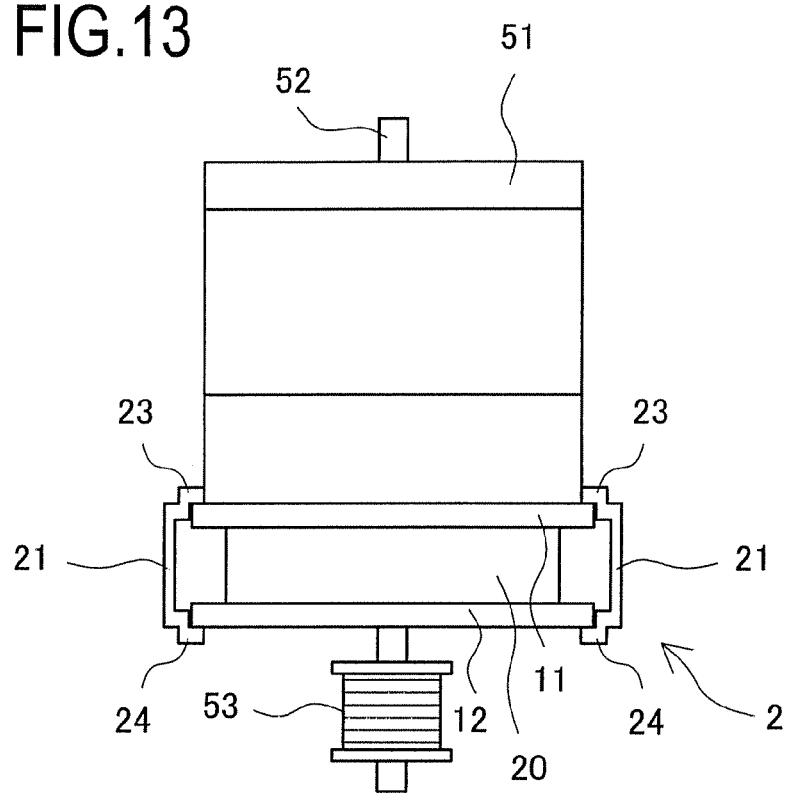
FIG. 13 is a front view of a mount damper in a second embodiment.

A mount damper of this embodiment is constituted as shown in FIG. 13. In FIG. 13, the mount damper 2 of this embodiment is illustrated together with the motor 51 and the gear 53. In FIG. 13, the support body 50 and the control section 54 shown in FIG. 1 are omitted but they have the same configurations as those in the first embodiment.

The mount damper 2 in FIG. 13 is configured such that a rubber member 20 is sandwiched between two electrode plates 11 and 12 and polymeric artificial muscles 21 are attached around the electrode plates 11 and 12. This rubber member 20 has a property of increasing hardness when compressed and decrease hardness when extended. However, it is a mere extendible and contractible member, which does not serve as an actuator capable of expanding and contracting by itself such as the electrostrictive polymer member 10 of the first embodiment.

In this embodiment, it is the polymeric artificial muscles 21 to serve the above function as an actuator. Each polymeric artificial muscle 21 is made of a material identical to that of the electrostrictive polymer member 10 of the first embodiment. Each polymeric artificial muscle 21 is made in such a way that the material is formed in a rod, and both ends of the rod are bent in hooked shape, forming bent portions 22 and 23. Each polymeric artificial muscle 21 is placed by grasping the electrode plates 11 and 12 from outside by the bent portions 22 and 23. In the mount damper 2 of this embodiment, specifically, the polymeric artificial muscles 21 and the rubber member 20 share the function of changing a distance between the electrode plates 11 and 12 by voltage therebetween and the function of changing hardness, respectively.

Figure 14:
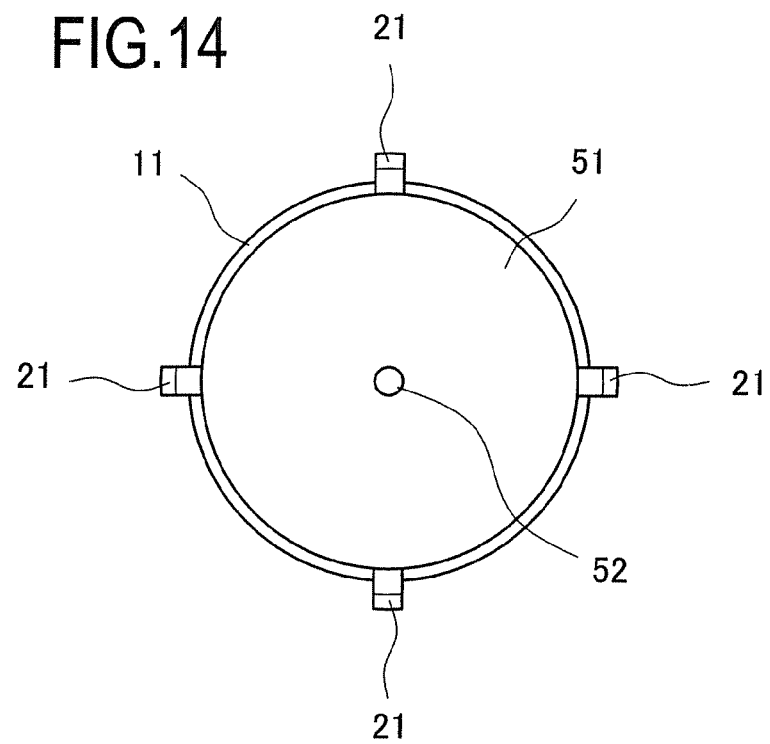
FIG. 14 is a plane view of the mount damper in the second embodiment.

The polymeric artificial muscles 21 are placed in several positions on edges of the electrode plates 11 and 12 as shown in FIG. 14. The number of polymeric artificial muscles 21 is not particularly limited. FIG. 14 shows a top view of the mount damper 2 and the motor 51 of FIG. 13. The polymeric artificial muscles 21 formed in a rod shape and arranged in a spaced relation may be replaced with a polymeric artificial muscle formed in a cylindrical shape to fully cover the periphery of the mount damper 2.

Figure 15:
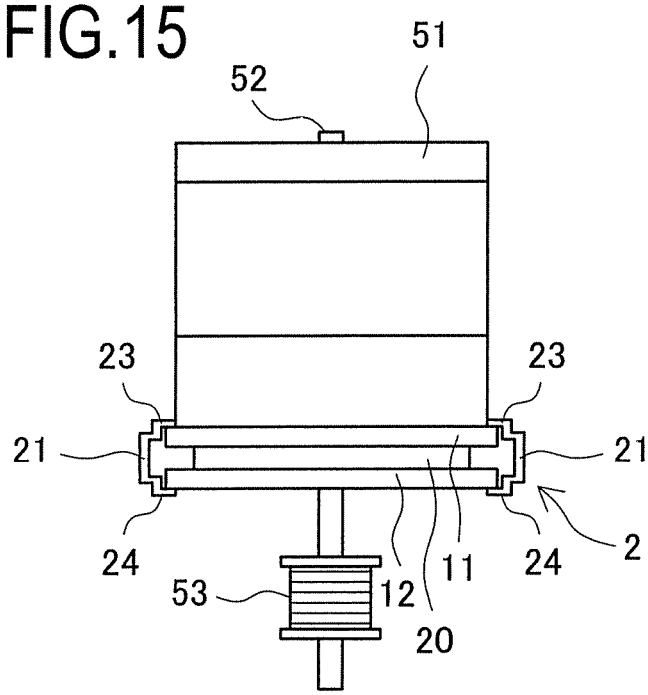
FIG. 15 is a front view of the mount damper in the second embodiment, showing a state where interelectrode voltage is high.

In the present embodiment configured as above, similarly, the distance between the electrode plates 11 and 12 can be changed by application of voltage thereto, thereby changing a resonant frequency. FIG. 15 shows a state where the distance between the electrode plates 11 and 12 is shortened by application of high voltage. FIG. 13 mentioned above shows a state where the applied voltage is low. As above, the mount damper 2 of this embodiment also can effectively restrict vibration by changing the applied voltage according to the rotation speed of the motor 51 and the mounting condition thereof in a similar manner as explained in the first embodiment referring to FIGS. 5 to 12.

Embodiment Adopted in Image Forming Apparatus

Figure 16:
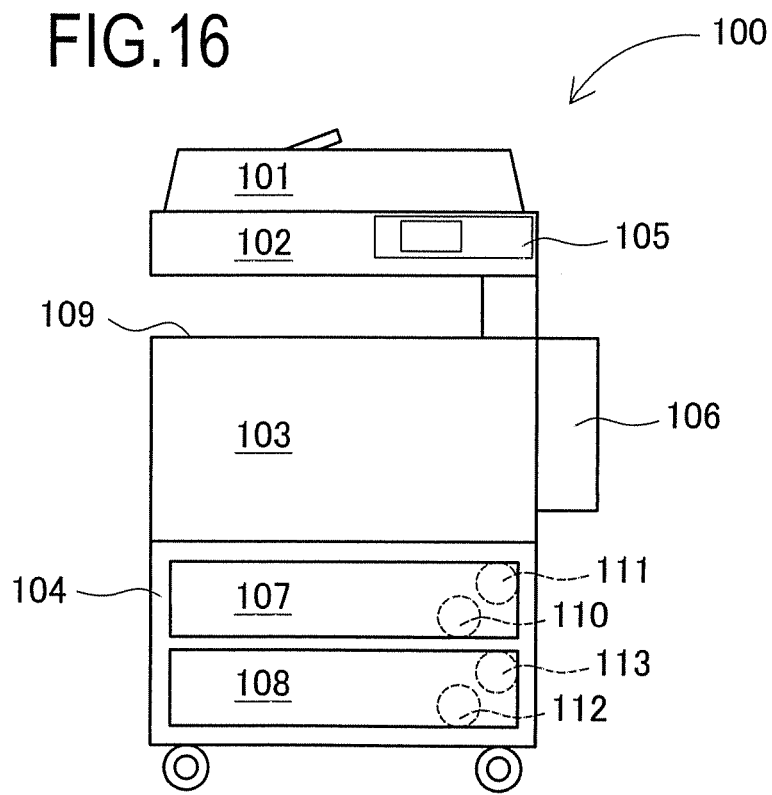
FIG. 16 is a front view of an image forming apparatus adopting the mount damper according to the present invention.

An example of applying the mount damper of the present invention to a rotary drive system of an image forming apparatus now will be explained. The mount damper used in the image forming apparatus may be either one of the mount damper in the first embodiment or that in the second embodiment. An image forming apparatus 100 shown in FIG. 16 includes, from top, a document feeder 101, an image scanner 102, a main unit 103, and a sheet feeder 104. The image scanner 102 is provided with a control panel 105.

The main unit 103 is configured to form an image on a sheet with toner and contains a well known photoreceptor, exposure unit, transfer unit, fixing unit, and other process units. This main unit 103 is further provided with a sheet reversing unit 106 for double-sided printing. The sheet feeder 104 includes two sheet feed cassettes 107 and 108. The image forming apparatus 100 is thus arranged such that the document feeder 101 feeds a document, the image scanner 102 reads an image of a document, and a resultant image is formed on a sheet supplied from the sheet feeder 104. The image printed sheet is discharged into an output tray 109 provided on top of the main unit 103.

Herein, the mount damper 1 of the first embodiment (or the mount damper 2 of the second embodiment) is used in the sheet feeder 104 in the image forming apparatus 100. To be concrete, the sheet feeder 104 contains a pick-up motor 110 for picking out a sheet from the sheet feed cassette 107, a feed motor 111 for delivering the picked sheet toward the main unit 103, a pick-up motor 112 for picking out a sheet from the sheet feed cassette 108, and a feed motor 113 for delivering the picked sheet toward the main unit 103. In the image forming apparatus 100, the mount dampers 1 or 2 of the above embodiment are used to mount the above motors 110 to 113.

In the image forming apparatus 100, a print sheet on which an image is to be formed is supplied from either one of the sheet feed cassette 107 or 108 to the main unit 103. When a print sheet is to be supplied from the cassette 107, the motors 110 and 111 are rotated. When a print sheet is to be supplied from the cassette 108, the motors 112 and 113 are rotated. The rotation speed of each motor differs according to whether the print sheet to be supplied is a regular sheet or a thick sheet. For the regular sheet which can be fed at a high speed, the motors are rotated at 2000 pps in terms of a pulse rate. For the thick sheet which is difficult to feed at a high speed, the motors are rotated at 1000 pps in terms of a pulse rate.

The mount damper 1 (or 2) used for mounting each of the motors 110 to 113 has the following relationship of presence and absence of resonance by the applied voltage and the rotation speed.

For an applied voltage of 2V, resonance will occur at 1000 pps and will not occur at 2000 pps.

For an applied voltage of 8V, resonance will not occur at 1000 pps and will occur at 2000 pps.

Accordingly, the applied voltage to the mount dampers 1 (or 2) for the motors 110 and 111 (or 112 and 113) are determined as below according to the kind of a print sheet to be supplied.

Regular sheet (2000 pps): Applied voltage of 2V; and

Thick sheet (1000 pps): Applied voltage of 8V.

Figure 17:
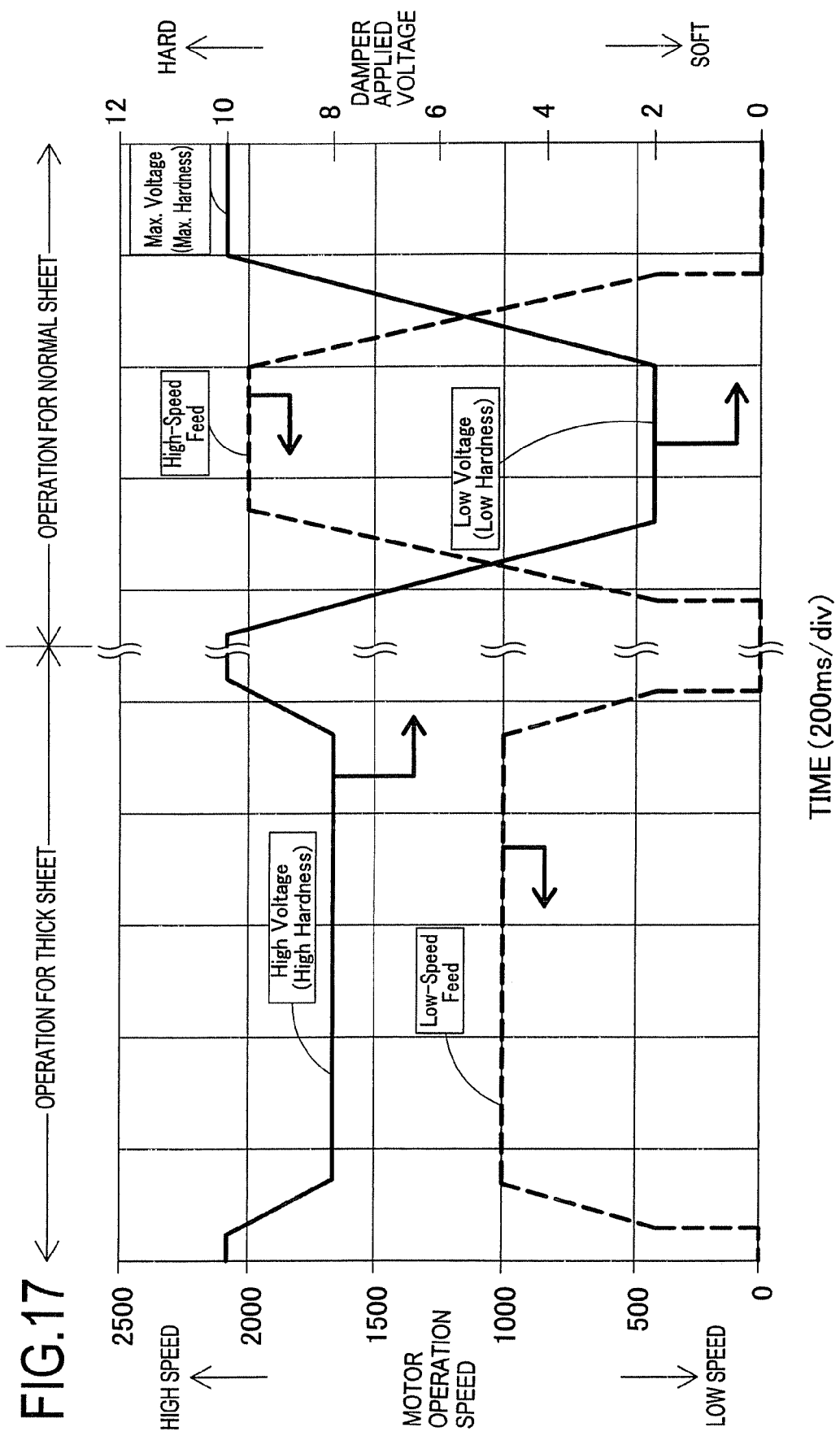
FIG. 17 is a graph showing a relationship between rotation speed of a motor in a sheet feeder in the image forming apparatus of the present embodiment and voltage applied to the mount damper.

This relation is shown on a graph of FIG. 17. Accordingly, irrespective of the kind of a print sheet to be supplied, that is, irrespective of a feeding speed of the print sheet, the motors in the sheet feeder 104 will not cause resonance. In the graph of FIG. 17, the applied voltage to the mount damper 1 (or 2) is adjusted to a maximum voltage (10V) during halt of the motors between one sheet feeding operation and a next sheet feeding operation. The applied voltage during the motor stopping is not limited thereto and may be any voltage, e.g. 0V, because resonance will not occur during the motor stop.

Herein, the reason for using different feeding speeds is explained above by referring to the kinds of print sheets. However, the reason is not limited thereto. For instance, there is a case where the feeding speed is reduced than normal in order to form an image with high definition in the main unit 103. To the contrary, there is a case where high-speed printing is conducted even at the expense of high definition. Even in the cases where the feeding speed is changed for the above reasons, the rotation speeds of the motors 110 to 113 are also changed accordingly. Even in such cases, it is possible to prevent resonance by appropriately controlling the applied voltage to each mount damper 1 (or 2).

In the image forming apparatus 100, it is not only the sheet feeder 104 that mounts motors therein. The main unit 103 also mounts a sheet feed motor and further a motor for driving each movable part such as a photoreceptor. The sheet reversing unit 106 also mounts a sheet feed motor. When the feeding speed of a print sheet is to be changed, the rotation speed of each of those motors is also changed. Thus, those motors are preferably mounted through the mount dampers 1 (or 2).

The document feeder 101 mounts therein a document feed motor. The image scanner 102 mounts therein a scan motor for capturing an image of a document put on a flat place. They are not always linked to the feeding speed of the print sheet but their rotation speeds may be changed according to a reading mode. Therefore, those motors are also preferably mounted by use of the mount dampers 1 of the present invention.

Figure 18:
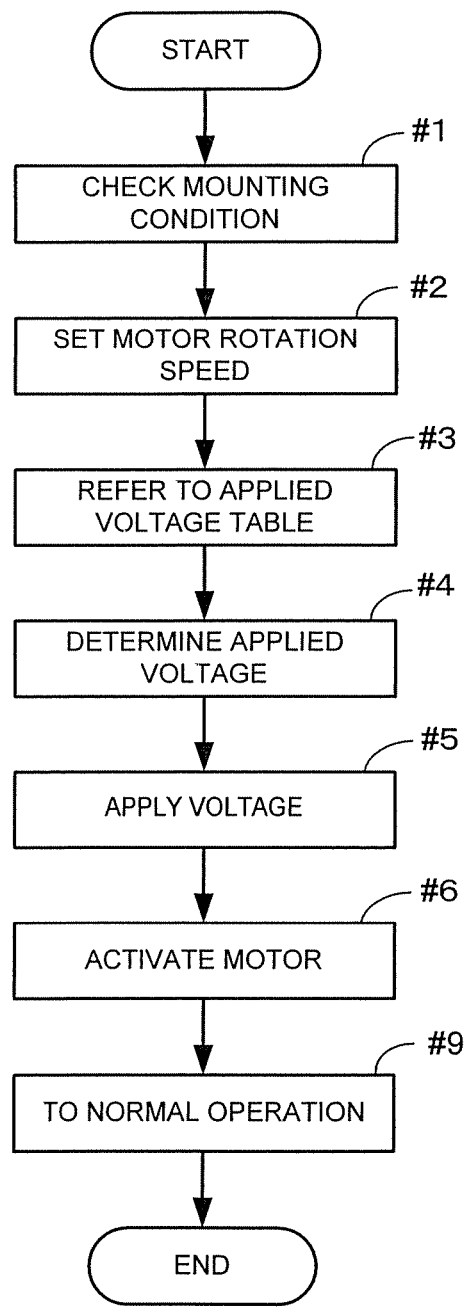
FIG. 18 is a flowchart (Part 1) for control of the mount damper in the present embodiment.
Figure 19:
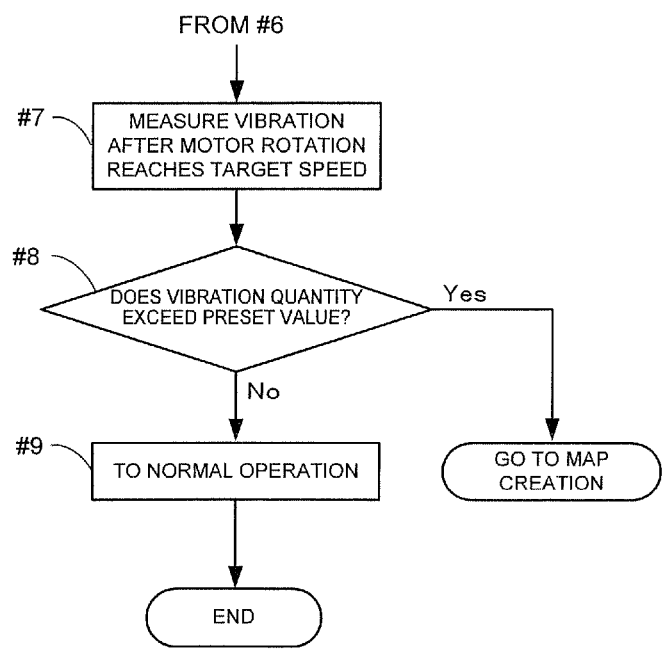
FIG. 19 is a flowchart (Part 2) for control of the mount damper in the present embodiment.
Figure 20:
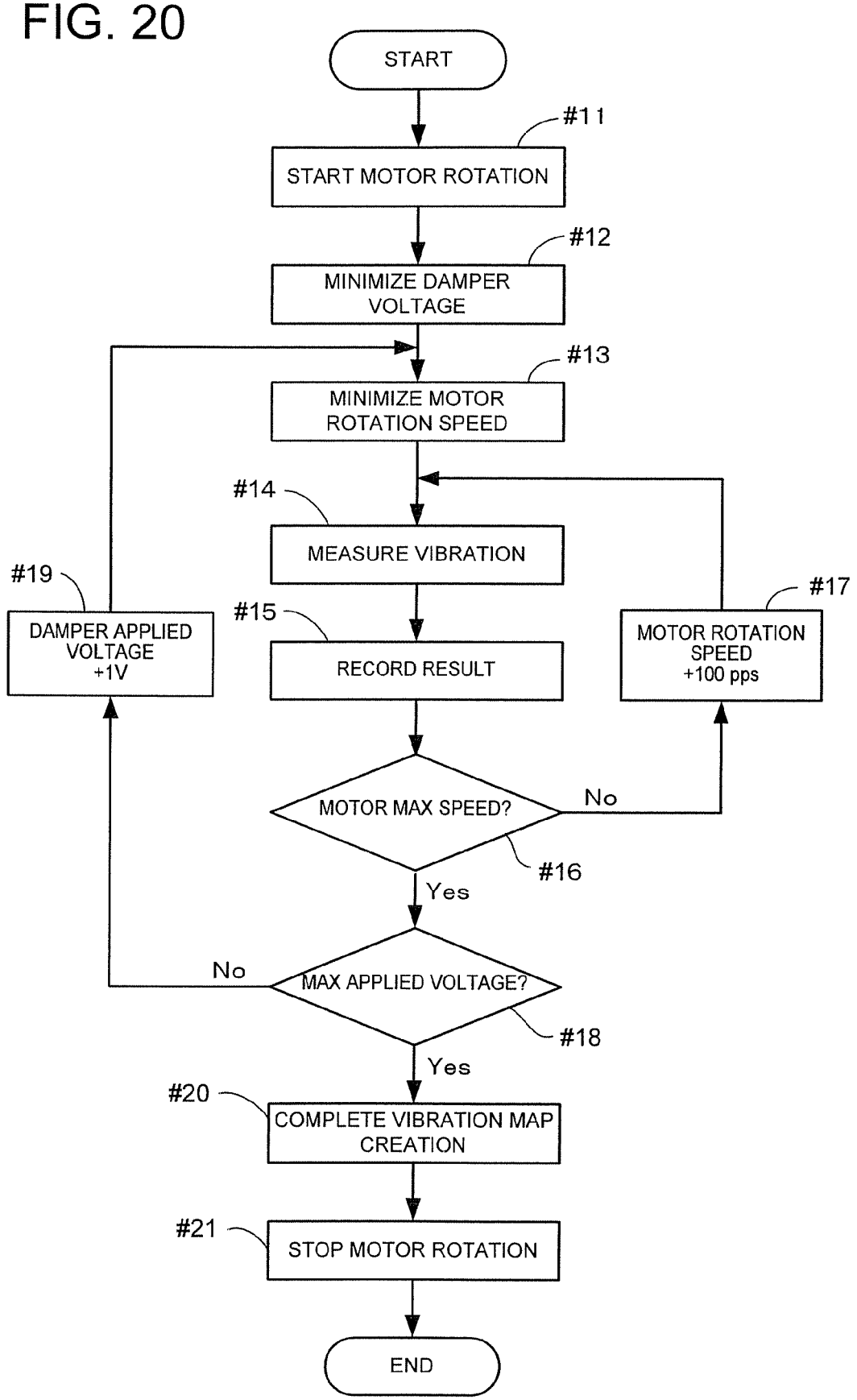
FIG. 20 is a flowchart (Part 3) for control of the mount damper in the present embodiment.

The details of the control in the control section 54 shown in FIG. 4 are now explained with reference to flowcharts in FIGS. 18 to 20. FIG. 18 shows a basic process flow for activating the motor 51 from a stopping state in a normal operation mode. FIG. 19 shows a process flow for vibration measurement after motor activation. FIG. 20 shows a process flow for implementing a vibration map creation processing as a correction mode.

In the basic process flow in FIG. 18, firstly, a mounting condition is checked (#1). Specifically, it is checked whether the support body 50 of the motor 51 to be activated is constituted of a thin plate shown in FIG. 8 or a thick plate shown in FIG. 9. This check is conducted with reference to the mounting-condition data (see paragraph [0059]) in the ROM 62. Based on this check, one of the "mounting-condition correcting data tables" (see paragraphs [0042] and [0059]) is selected to be used.

Successively, the rotation speed of the motor 51 is set (#2). In the case of the aforementioned image forming apparatus, the rotation speed is selected mainly based on the kind of a print sheet. Specifically, basically, the rotation speed for the regular sheet is set to a high speed and the rotation speed for the thick sheet is set to a low speed. The applied voltage table in the ROM 62 is referred (#3). This applied voltage table is the "standard table" mentioned in paragraph [0042]. By referring to this standard table based on the rotation speed set in the step #2, a standard applied voltage to the mount damper 1 with respect to the set rotation speed is determined. Thus, the applied voltage is tentatively decided.

Consecutively, the applied voltage is decided (#4) by correcting the applied voltage tentatively decided in the step #3, by use of the correcting data table. This correcting data table is one selected in the step #2. Specifically, the standard applied voltage is corrected in consideration of the mounting condition of the motor 51. In this way, the applied voltage to the mount damper 1 is decided. Thus decided applied voltage is the voltage selected as the voltage at which resonance should not occur.

The decided applied voltage is actually applied to the mount damper 1 (#5). While the mount damper 1 is applied with the applied voltage, the motor 51 is activated (#6). Accordingly, the motor 51 can be activated while preventing vibration. This is because the voltage applied to the mount damper 1 is the voltage appropriate for the rotation speed and the mounting condition. Thereafter, a process flow advances to a normal operation (#9). The normal operation in the aforementioned image forming apparatus is a series of operations associated with image formation. Thus, the process flow in FIG. 18 is terminated.

In this basic process flow, a process for measuring a vibration state of the motor 51 may be additionally conducted after motor activation. The process flow in FIG. 19 shows the processing following the step #6 in that case. This measurement is conducted because the characteristics of the electrostrictive polymer member 10 (or the rubber member 20 and the polymeric artificial muscles 21, omitted hereafter) of the mount damper 1 may vary or change. Such change may result from an environmental factor such as temperature and aged deterioration. When the characteristics of the electrostrictive polymer member 10 and others change, the applied voltage decided in the flow in FIG. 18 may not always be optimal. This may cause abnormal vibration of the motor 51. To detect such state, the vibration state is measured.

For performing this measurement, a process in steps #7 and subsequent in FIG. 19 is first conducted following the step #6 in FIG. 18, without directly advancing to the normal operation. In other word, after activation of the motor 51, the vibration measurement is first conducted (#7). To be concrete, an output value of the vibration sensor 55 is checked. This measurement is performed after the motor 5 reaches a target rotation speed, that is, the rotation speed set in the step #2 in FIG. 18.

The measured value is compared with a preset value to determine whether or not the vibration quantity exceeds a permissible upper limit (#8). The preset value can be an appropriate value designated and stored in advance in the ROM 62. Specifically, it is a value of the vibration quantity corresponding to a point on or near the base of the mountain-like shape on the graph in FIG. 5 and other figures, i.e., a point slightly higher than a flat portion and lower than the peak value. If the vibration quantity does not exceeds the upper limit (#8: No), the flow process advances to the normal operation (#9). If the vibration quantity exceeds the upper limit (#8: Yes), the flow process advances to the map creation.

In the map creation, the motor 51 is started to rotate (#11). If it is just after the step #8 (Yes) in FIG. 19, the motor 51 has already been rotated, so the flow will directly advance to a next step. The applied voltage to the mount damper 1 is set at a minimum value in an actually usable range (#12). This minimum value can be 0V. Furthermore, the rotation speed of the motor 51 is set at a minimum value in an actually usable range (#13). This minimum value is always a positive value, not 0 pps. In this state, the vibration measurement is conducted (#14). By this measurement, the vibration quantity corresponding to the minimum values of the applied voltage and the rotation speed is obtained. This result is stored in the RAM 63 (#15).

It is then determined whether or not the rotation speed of the motor 51 has reached a maximum speed (#16). At this time, the rotation speed is the minimum value and hence a determination result is "No". Accordingly, the rotation speed of the motor 51 is incremented by one level (#17). This one level in FIG. 20 is 100 pps but it is not limited thereto. The steps #14 to #16 are repeated again after each increment of the rotation speed. Specifically, while the applied voltage to the mount damper 1 is kept unchanged, the vibration quantity is measured at each incremental level of the rotation speed of the motor 51 by scanning the rotation speed. This process is continued until the rotation speed reaches the maximum speed.

When the rotation speed of the motor 51 reaches the maximum value (#16: Yes), it is determined whether or not the applied voltage to the mount damper 1 has reached the maximum voltage (#18). At this time, the applied voltage is the minimum value and hence a determined result is "No". The applied voltage to the mount damper 1 is accordingly incremented by one level. This one level in FIG. 20 is set as 1V but it is not limited thereto. The steps #13 to 18 are then repeated again after each increment of the applied voltage. Specifically, the vibration quantity in a period from the minimum rotation speed to the maximum rotation speed is obtained at each incremental level of the applied voltage to the mount damper 1 by scanning the applied voltage. This process is continued until the applied voltage reaches the maximum voltage.

When the applied voltage to the mount damper 1 reaches the maximum voltage (#18: Yes), it represents that the vibration map is completely created (#20). The rotation of the motor 51 is stopped (#21) for termination of the map creation processing. The created vibration map is stored in the RAM 63. In the subsequent process, the thus created vibration map is used to correct the "standard table" in the ROM 62. Consequently, the voltage is controlled appropriately for the characteristics of the electrostrictive polymer member 10 and others at that time, thereby reliably preventing vibration.

In the case where the device has a temperature sensor, it is preferable to store the created vibration map together with the temperature at the time of map creation. This enables the use of the created vibration map when the motor is to be operated again under the same temperature unless the aged deterioration of the electrostrictive polymer member 10 and others greatly becomes advanced.

As to the frequency of execution of the correction mode in FIG. 20, for example, the motor may be normally activated in the normal mode in FIG. 18 and the process in FIG. 19 may be conducted at appropriate frequencies instead of the process in FIG. 18. Alternatively, the motor may be always activated in accordance with the process flow in FIG. 19. Accordingly, the correction mode is executed immediately when the tendency of vibration to increase appears.

The mount damper in the present embodiment as explained in detail above is provided with the electrostrictive polymer member 10 or the polymeric artificial muscles 21. Accordingly, adjustment of the voltage applied between the electrode plates 11 and 12 enables control of the hardness of the electrostrictive polymer member 10 and others. This makes it possible to prevent resonance according to the rotation speed and the mounting condition of the motor 51. Thus, even a single type of mount damper can adapt to various circumstances of a motor. It also can adapt to changes in characteristics of the electrostrictive polymer member 10 and others due to the environmental factor and the aged deterioration.

The above embodiments are merely examples and do not limit the invention. The present invention may be embodied in other specific forms without departing from the essential characteristics thereof. For instance, the model of the motor 51 is not limited to the stepping motor mentioned in the above embodiments. Furthermore, the electrostrictive polymer member 10 of the first embodiment is not always required to be provided along the entire periphery of the rotary shaft 52.

While the presently preferred embodiment of the present invention has been shown and described, it is to be understood that this disclosure is for the purpose of illustration and that various changes and modifications may be made without departing from the scope of the invention as set forth in the appended claims.

The voltage control section in the present embodiment preferably adjusts the voltage to be applied between the first and second electrodes according to a rotation speed of the rotary drive source. With this configuration, even if the rotation speed of the rotary drive source is changed, the interelectrode voltage is adjusted according to the changed rotation speed. Accordingly, the hardness of the elastic body is so adjusted as to prevent resonance according to the change in rotation speed.

The voltage control section preferably adjusts the voltage to be applied between the first and second electrodes according to a mounting condition of the rotary drive source to the support body. The condition of the mounting place means for example the plate thickness, material, and other conditions of a portion constituting the mounting place. This is also a factor that can influence the natural frequency of the mount damper. According to the present embodiment, the interelectrode voltage is controlled according to the condition of the mounting place, thereby preventing resonance.

The second electrode in the present invention may be fixed to the support body. Furthermore, part of the support body may be used directly as the second electrode. In those cases, the voltage control section preferable puts the second electrode at a ground potential and the first electrode to at a non-ground potential.

The mount damper of the present invention further comprises: a storage section for storing vibration characteristics of the rotary drive source to be mounted; and a vibration sensor for measuring a degree of vibration of the rotary drive source during rotation thereof, wherein the voltage control section performs: a normal mode of selecting a voltage causing no resonance based on a stored content in the storage section, and then applying the selected voltage between the first and second electrodes; and a correction mode of obtaining a measurement result of the vibration sensor by scanning the voltage applied between the first and second electrodes, and then correcting the stored content in the storage section based on the obtained result.

When the correction mode is executed at appropriate frequencies, resonance can be effectively prevented in the normal mode.

Herein, the present invention is of great significance in the case where the rotary drive source is a stepping motor. If excessive vibration is caused by resonance, the stepping motor tends to lose synchronization or come near to such a state, resulting in a significant decrease in output power. The use of the mount damper of the present invention can prevent such a situation.

The invention claimed is:

1. A mount damper for mounting a rotary drive source on a support body and absorbing vibration of the rotary drive source during driving rotation thereof, the mount damper comprising:
   a first electrode to be placed on a side of the rotary drive source;
   a second electrode to be placed on a side of the support body;
   a voltage control section for controlling voltage to be applied between the first and second electrodes to thereby change a distance between the first and second electrodes;
   an elastic body placed between the first and second electrodes, the elastic body having a hardness changeable with the change in the distance between the first and second electrodes;
   a storage section for storing vibration characteristics of the rotary drive source to be mounted; and
   a vibration sensor for measuring a degree of vibration of the rotary drive source during rotation thereof,
   wherein the voltage control section:
   selects a voltage causing no resonance based on a stored content in the storage section, and then applies the selected voltage between the first and second electrodes;

obtains a measurement result of the vibration sensor by scanning the voltage applied between the first and second electrodes, and then corrects the stored content in the storage section based on the obtained result; and adjusts a value of the voltage to be applied between the first and second electrodes to thereby adjust the resonant frequency of the rotary drive source and the elastic body.

2. The mount damper according to claim 1, wherein the elastic body comprises an electrostrictive polymer member for changing the distance between the first and second electrodes by the voltage between those electrodes.

3. The mount damper according to claim 1, further comprising an electrostrictive polymer member for changing the distance between the first and second electrodes by the voltage between those electrodes, wherein the electrostrictive polymer member is provided separately from the elastic body.

4. The mount damper according to claim 1, wherein the voltage control section adjusts the voltage to be applied between the first and second electrodes according to a rotation speed of the rotary drive source.

5. The mount damper according to claim 1, wherein the voltage control section adjusts the voltage to be applied between the first and second electrodes according to a condition of a portion of the support body on which the rotary drive source is mounted.

6. The mount damper according to claim 1, wherein the second electrode is to be fixed to the support body, and the voltage control section puts the second electrode at a ground potential and the first electrode at a non-ground potential.

7. An image forming apparatus comprising:
an image forming unit for forming an image on a visible recording medium;
a sheet feed mechanism for feeding the visible recording medium to be supplied to the image forming unit;
a rotary drive source placed in the image forming apparatus; and
a mount damper mounting the rotary drive source on the image forming apparatus and absorbing vibration of the rotary drive source during driving rotation thereof,
wherein the mount damper comprises:
a first electrode placed on a side of the rotary drive source;
a second electrode placed on a side of the image forming apparatus;
a voltage control section for controlling voltage to be applied between the first and second electrodes to thereby change a distance between the first and second electrodes; and
an elastic body placed between the first and second electrodes, the elastic body having a hardness changeable with the change in the distance between the first and second electrodes,
wherein the voltage control section adjusts a value of the voltage to be applied between the first and second electrodes to thereby adjust the resonant frequency of the rotary drive source and the elastic body.

8. The image forming apparatus according to claim 7, wherein the rotary drive source is a stepping motor.

9. The image forming apparatus according to claim 7, wherein the elastic body comprises an electrostrictive polymer member for changing the distance between the first and second electrodes by the voltage between those electrodes.

10. The image forming apparatus according to claim 7, further comprising an electrostrictive polymer member for changing the distance between the first and second electrodes by the voltage between those electrodes, wherein the electrostrictive polymer member is provided separately from the elastic body.

11. The image forming apparatus according to claim 7, wherein the voltage control section adjusts the voltage to be applied between the first and second electrodes according to a rotation speed of the rotary drive source.

12. The image forming apparatus according to claim 7, wherein the voltage control section adjusts the voltage to be applied between the first and second electrodes according to a condition of a portion on which the rotary drive source is mounted.

13. The image forming apparatus according to claim 7, wherein the second electrode is to be fixed to the image forming apparatus, and the voltage control section puts the second electrode at a ground potential and the first electrode at a non-ground potential.

14. The image forming apparatus according to claim 7, further comprising:
a storage section for storing vibration characteristics of the rotary drive source mounted; and
a vibration sensor for measuring a degree of vibration of the rotary drive source during rotation thereof,
wherein the voltage control section performs:
a normal mode of selecting a voltage causing no resonance based on a stored content in the storage section, and then applying the selected voltage between the first and second electrodes; and
a correction mode of obtaining a measurement result of the vibration sensor by scanning the voltage applied between the first and second electrodes, and then correcting the stored content in the storage section based on the obtained result.

* * * * *